United States Patent Office 3,017,419
Patented Jan. 16, 1962

3,017,419
11α-METHYL-ANDROSTANE DERIVATIVES
Howard J. Ringold, John A. Zderic, Enrique Batres, and George Rosenkranz, all of Mexico City, Mexico, assignors to Syntex S.A., Mexico City, Mexico, a corporation of Mexico
No Drawing. Filed July 21, 1958, Ser. No. 749,617
Claims priority, application Mexico July 20, 1957
2 Claims. (Cl. 260—397.45)

The present invention relates to cyclopentanophenanthrene compounds and to a process for the preparation thereof.

More particularly the present invention relates to novel 11α-methyl-11β-hydroxy compounds of the androstane series including especially those compounds having the conventional keto and hydroxy groups at C–3 and/or C–17 as well as those having both the 11β-hydroxy and α-methyl groups at C–17 as well as the esters of these compounds with hydrocarbon carboxylic acids of less than 12 carbons. The term androstane series includes both saturated compounds as well as those compounds having a C–4(5) double bond. The compounds of the present invention described above and to be hereinafter set forth in detail are all androgenic type hormones having a very high anabolic property coupled with a minimum of androgenic activity. They also exhibit the antiestrogenic properties characterizing the androgenic type hormones.

In accordance with the present invention it has been discovered that the novel 11α-methyl-11β-hydroxy androstane compounds hereinbefore set forth may be prepared by reacting an 11-keto androstane derivative with methyl lithium (LiCH₃). In the event that the androstane derivative contains other keto groups these are conventionally protected by the temporary formation of a cycloethylene ketal or enamine. If on the other hand it is desired to react simultaneously with more than one keto group this may be left unprotected. Thus by this means there may be formed simultaneously 11α,17α-dimethyl-11β,17β-dihydroxy androstane compounds. The resultant compounds can of course be conventionally reacted to form esters of the free alcohol groups or hydroxy groups in place of reconstituted keto groups.

The novel androgenic type hormones of the present invention may be illustrated by the following formula:

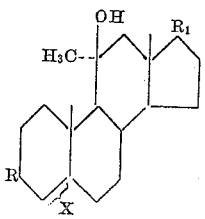

In the above formula X represents a double bond between C–4 and C–5 or the saturated linkage between C–4 and C–5 characterizing an allo (androstan) compound. R is selected from the group consisting of =O,

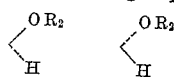

and R₂ is hydrogen or a conventional hydrocarbon carboxylic ester group of less than 12 carbon atoms. These ester groups as well known in the art may be saturated or unsaturated, straight or branched chain aliphatic, cyclic or mixed cyclicaliphatic. They may be conventionally substituted as with methoxy or halogen. Typical ester groups are for example acetate, propionate, cyclopentylpropionate, benzoate, trimethylacetate, hemisuccinate, phenoxypropionate and β-chloropropionate. R₁ represents

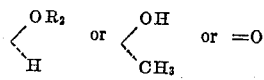

The following equations illustrate the process of the present invention:

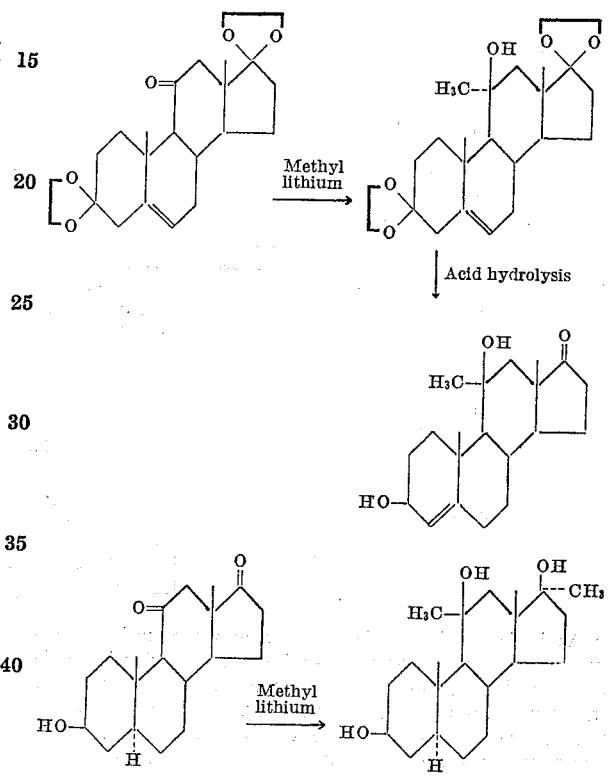

The first of the above equations illustrates the reaction with methyl lithium applied to the known 3,17-bis-cycloethylene ketal of adrenosterone (described by Bernstein et al., J.A.C.S. 75, 1481 (1953)) and illustrates the reaction with the keto group at C–11 only since the 3- and 20-keto groups are protected. For this type of reaction a large excess of methyl lithium about 10 molar equivalents are used preferably in ether solution and the reaction mixture is kept under nitrogen for about 2 days. In the second type of reaction where two keto groups are reacted with an even larger excess (about 15 molar equivalents) is used and the same reaction conditions followed. The resultant compounds after conventional separation and purification are in the first case the basic intermediate 11α-methyl-Δ⁴-androsten-11β-ol-3,17-dione and in the second, 11α,17α - dimethyl - androstan-3β,11β,17β-triol which may also be prepared from the first mentioned basic intermediate by conventional reactions hereinafter described.

The basic intermediate 11α-methyl-Δ⁴-androsten-11β-ol-3,17-dione may be transformed into the corresponding compounds having 17-hydroxy groups, or 3- and 17-hydroxy groups or the same compounds having in addition a 17-methyl group by the conventional reactions illustrated in the following equations:

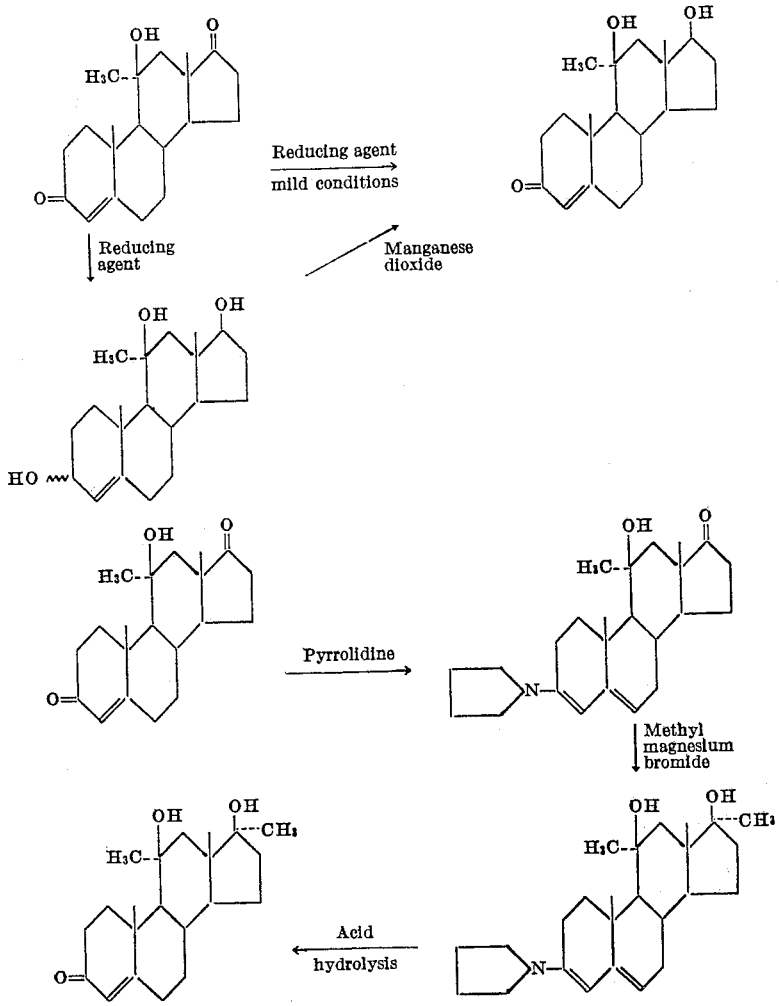

As indicated in the first of the above equations conventional reduction as with sodium borohydride in moderate or slight excess at 0° C. for a short period resulted in the reduction of the 17-keto only. On the other hand reaction with a larger excess of sodium borohydride at room temperature or lithium aluminum hydride under reflux conditions reduced both the 3- and 17-keto groups to hydroxy and gave a mixture of α and β 3-hydroxy 17β-hydroxy compounds.

As illustrated in the second equation above, temporary protection of the 3-keto group by formation of an enamine for example followed by conventional reaction with methyl magnesium bromide gave 11α,17α-dimethyl-Δ⁴-androsten-11β,17β-diol-3-one; although not indicated above, this last compound upon reduction with sodium borohydride or lithium aluminum hydride gave the corresponding 3-alcohols.

All of the compounds previously described upon hydrogenation by means of lithium metal in liquid ammonia gave the corresponding saturated androstane derivatives as indicated below:

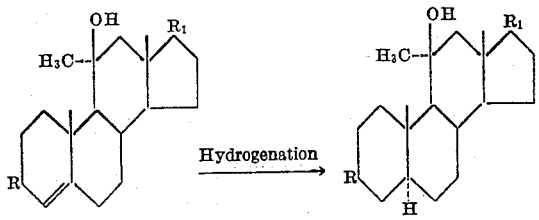

In the above equation R and $R_1$ represent the same groups as heretofore.

In addition to the foregoing illustrated reactions conventional esterification with hydrocarbon carboxylic acid anhydrides or chlorides of less than 12 carbon atoms gave the corresponding esters of the secondary hydroxyl of the compounds previously indicated.

The following specific examples serve to illustrate but are not intended to limit the present invention.

*Example 1*

2 g. of 3,17-bis-ethylenedioxy-Δ⁵-androsten-11-one (bis-cycloethyleneketal of adrenosterone) was dissolved in 250 cc. of absolute ether and the stirred solution was slowly mixed with 45 cc. of an ether solution of 10 molar equivalents of methyl lithium, under an atmosphere of nitrogen. The mixture was kept under nitrogen at room temperature for 48 hours and then poured into ice water; the ether layer was separated, washed with water to neutral, dried over anhydrous sodium sulfate, filtered and concentrated until crystallization. After cooling, the precipitate was collected and washed with a little cold ether, thus yielding 11α - methyl - 3,17-bis-ethylenedioxy Δ⁵-androsten-11β,-ol, M.P. 185–187° C., [α]$_D$ —70.8° (chloroform), the compound showed in the infrared the characteristic band of free hydroxyl groups.

A solution of 1.5 g. of the above compound in 50 cc. of acetone was mixed with 50 mg. of p-toluenesulfonic acid and kept standing at room temperature for 20 hours. The solution was poured into water and extracted with ethyl acetate and the extract was washed with sodium bicarbonate solution and with water to neutral, dried over anhydrous sodium sulfate and evaporated to dryness. The residue consisting of a clear viscous oil was purified by chromatography, thus producing 11α-methyl-Δ⁴-androsten-11β-ol-3,17-dione, M.P. 149–150.5° C., [α]$_D$ +165° (chloroform), ultraviolet absorption λ max. 242–244 mμ, log E 4.19. Several recrystallizations from acetone-hexane afforded the analytical sample M.P. 151–152° C., [α]$_D$ +162°, ultraviolet absorption: λ max. 242–244 mμ, log E 4.19. In another experiment, the ketal groups of 11α-methyl-3,20-bis-ethylenedioxy-Δ⁵-androsten-11β-ol were hydolyzed by heating the compound on the steam bath for 20 minutes with 10 cc. of acetic acid containing 3.3 cc. of water. The reaction mixture was poured into water and the precipitate formed was collected, washed with water, dried and recrystallized from acetone-hexane. There was thus obtained 11α - methyl - Δ⁴ - androsten - 11β - ol - 3,17 - dione having the same characteristics as the compound described above.

Example II

A stirred solution of 300 mg. of 11α-methyl-Δ⁴-androsten-11β-ol-3,17-dione in 60 cc. of methanol, previously cooled to 0° C., was slowly mixed with 22.4 mg. of powdered sodium borohydride, taking care that the temperature remained below 0° C. The mixture was stirred at this temperature for 1 hour further, the excess of reagent was destroyed by the addition of acetic acid and the mixture was concentrated under reduced pressure to a volume of approximately 5 cc. and then poured into water. The crystalline precipitate (needles) was collected and purified by chromatography in a column of alkaline alumina. There was thus produced 11α-methyl-Δ⁴ - androsten - 11β,17β - diol - 3 - one in crystalline form, M.P. 255–256° C., ultraviolet absorption: λ max. 242 mμ, log E 4.19.

Example III 300 mg. of 11α-methyl-Δ⁴-androsten-11β-ol-3,17-dione dissolved in 60 cc. of methanol was treated at room temperature with a solution of 100 mg. of sodium borohydride in 2 cc. of water and the mixture was kept for 4 hours at room temperature. The reaction product was then worked up by the method described in the previous example. There was thus obtained 11α-methyl-Δ⁴-androsten-3β,11β,17β-triol.

Example IV

A solution of 300 mg. of 11α-methyl-Δ⁴-androsten-11β-ol-3,17-dione in 20 cc. of tetrahydrofurane was added dropwise to a stirred suspension of 200 mg. of lithium aluminum hydride in 20 cc. of tetrahydrofurane and the mixture was refluxed for 1 hour. The excess of hydride was decomposed by the addition of a few drops of acetone and then saturated sodium sulfate solution was added. The solution was filtered from the inorganic salts which were washed with hot tetrahydrofurane and the combined filtrate and washings was evaporated to dryness under reduced pressure. The residue was triturated with a little ether and the crystalline precipitate formed was collected. The product consisted of a mixture of the 3α and 3β isomers of 11α-methyl-Δ⁴-androstene-3β,11β,-17β-triol which were separated by chromatography.

Example V 200 mg. of 11α-methyl-Δ⁴-androsten-3β,11β,17β-triol, prepared by any of the methods of Examples III and IV, was dissolved in 20 cc. of chloroform, mixed with 1 g. of manganese dioxide and stirred for 6 hours at room temperature; an additional gram of manganese dioxide was added and the stirring was continued overnight. The manganese dioxide was separated by filtration and the chloroform solution was evaporated to dryness. Crystallization of the residue from acetone-hexane produced 11α-methyl-Δ⁴-androstene-11β,17β-diol-3-one, identical to the compound obtained in accordance with the method of Example II.

Example VI

A solution of 500 mg. of 11α-methyl-Δ⁴-androsten-11β-ol-3,17-dione in 10 cc. of a mixture of equal parts of dioxane and ether was rapidly added to a mechanically stirred solution of 100 mg. of lithium in 30 cc. of liquid ammonia. 600 mg. of ammonium chloride was added, the ammonia was allowed to evaporate, water was added and the mixture was extracted with methylene dichloride. The extract was washed with water, dried over anhydrous sodium sulfate, filtered and evaporated to dryness. The residue was purified by chromatography, thus yielding 11α-methyl-androstan-11β-ol-3,17-dione.

By an analogous method there was reduced the double bond of 11α-methyl-Δ⁴-androsten-11β,17β-diol to produce 11α-methyl-androstan-11β,17β-diol-3-one.

The reduction of 11α - methyl-androstan-11β-ol-3,17-dione by the method described in Example III, afforded 11α-methyl-androstan-3β,11β,17β-triol. The same compound was also obtained by reduction of 11α-methyl-androstan-11β,17β-diol-3-one by the same method; the reduction by refluxing with lithium aluminum hydride, following the method of Example IV, gave a mixture of the 3α and 3β isomers, which were separated by chromatography.

Example VII

A solution of 500 mg. of 11α-methyl-Δ⁴-androsten-11β-ol-3,17-dione in 4 cc. of methanol was heated to around 50° C. and mixed under stirring with 0.3 cc. of pyrrolidine. After cooling the mixture in ice, the crystalline precipitate was collected to give 3-N-pyrrolidyl-11α-methyl-Δ³,⁵ - androstadien-11β-ol-17-one, M.P. 231–235° C. Recrystallization from acetone gave the analytical sample M.P. 238–240° C., [α]$_D$ −139° (pyridine).

The above compound was dissolved in 50 cc. of anhydrous benzene, thiophene free, and mixed with 3 cc. of a 4 normal solution of methyl magnesium bromide in ether and refluxed for 6 hours. The mixture was poured into ice water containing ammonium chloride and the organic layer was separated. The aqueous phase was extracted with ethyl acetate and the extract was combined with the organic layer separated first. The mixture was dried over anhydrous sodium sulfate, filtered and evaporated to dryness under reduced pressure. The residue was mixed with 1 g. of sodium acetate, 1.5 cc. of water, 15 cc. of methanol and 0.5 cc. of acetic acid and refluxed for 4 hours. The cooled mixture was diluted with water and extracted with ethyl acetate; the extract was washed with sodium bicarbonate solution and with water to neutral, dried over anhydrous sodium sulfate and evaporated to dryness. Chromatography of the residue furnished 11α,17α-dimethyl-Δ⁴-androsten-11β,17β-diol-3-one.

Reduction of this compound with sodium borohydride, by an analogous method to that of Example II, yielded 11α,17α-dimethyl-Δ⁴-androsten-3β,11β,17β-triol, while refluxing with lithium aluminum hydride, in accordance with the method of Example IV, produced a mixture of the 3α- and 3β-isomers of this triol, which mixture could be separated into its components by chromatography.

When 11α,17α - dimethyl-Δ⁴-androsten-11β,17β-diol-3-one was treated with lithium metal in liquid ammonia, by the method described in Example VI for the saturation of the double bond between C–4 and C–5, there was obtained 11α,17α-dimethyl-androstan-11β,17β-diol-3-one.

Example VIII 1 g. of androstan-3β-ol-11,17-dione was treated with an ether solution of methyl lithium containing 15 molar equivalents of reagent, following the method described for this reaction in Example I. Water was added, the organic layer was separated and washed with water to neutral, dried over anhydrous sodium sulfate and evaporated to dryness. The solid residue was crystallized from acetone-hexane, thus producing 11α,17α-dimethylandrostan-3β,11β,17β-triol, M.P. 162–166° C., [α]_D −5° (chloroform).

500 mg. of chromium trioxide was added in four portions under stirring to 20 cc. of pyridine, maintaining the temperature below 35° C., until the dark red color of chromium trioxide had disappeared. The resulting suspension was then slowly mixed with a solution of 150 mg. of 11α,17α-dimethyl-androstan-β,11β,17β-triol in 5 cc. of pyridine and the mixture was kept overnight at room temperature. It was then diluted with ethyl acetate and filtered through celite and the solution was washed with dilute hydrochloric acid, sodium bicarbonate solution and water until the washings were colorless. The organic solution was dried over anhydrous sodium sulfate and evaporated to dryness under vacuum. Crystallization of the residue from acetone-hexane furnished 11α,17α-dimethyl-androstan-11β,17β-diol-3-one.

Reduction of this 11α,17β-dimethyl-androstan-11β,17β-diol-3-one with sodium borohydride, by the method of Example III, produced 11α,17α-dimethyl-androstan-3β,11β,17β-triol, while refluxing with lithium aluminum hydride, by the method of Example IV, afforded a mixture of the 3α- and 3β-isomers of this triol, which could be separated by chromatography.

*Example IX*

A mixture of 1 g. of 11α,17α-dimethyl-androstan-3β,11β,17β-triol, 10 cc. of pyridine and 1 cc. of acetic anhydride was kept overnight at room temperature and poured into water. The resulting suspension was heated for half an hour on the steam bath cooled and the crystalline precipitate was collected. It was washed with water, dried and recrystallized from acetone-hexane, thus yielding the 3-acetate of 11α,17α-dimethyl-androstan-3β,11β,17β-triol, M.P. 221–224° C.

By analogous method there can be esterified the secondary hydroxyl groups of all of the compounds obtained by the methods described in the previous examples, by reaction with a hydrocarbon carboxylic acid anhydride, of up to 12 carbon atoms, in pyridine solution. Thus there were prepared the corresponding C-17 esters of 11α-methyl-Δ⁴-androsten-11β,17β-diol-3-one, and of 11α-methyl-androstan-11β,17β-diol-3-one, the respective 3,17-diesters of 11α-methyl-Δ⁴-androsten-3,11β,17β-triol and 11α-methyl-androstan-3β,11β,17β-triol, as well as the 3-esters of 11α,17α-dimethyl-Δ⁴-androsten-3β,11β,17β-triol and of 11α,17α-dimethyl-androstan-3β,11β,17β-triol. Among these esters were specifically the acetates, propionates, cyclopentylpropionates and benzoates.

We claim:
1. 11α-methyl-androstan-11β-ol-3,17-dione.
2. 11α-methyl-androstan-11β,17β-diol-3-one.

References Cited in the file of this patent
UNITED STATES PATENTS

| | | |
|---|---|---|
| 2,249,748 | Dane | July 22, 1941 |
| 2,250,962 | Marker | July 29, 1941 |
| 2,517,226 | Bernstein et al. | Dec. 4, 1951 |
| 2,581,350 | Beall et al. | June 8, 1952 |
| 2,731,479 | Marshall | Jan. 17, 1956 |
| 2,740,798 | Ralls | Apr. 3, 1956 |
| 2,742,461 | Bernstein et al. | Apr. 17, 1956 |
| 2,743,271 | Arth | Apr. 24, 1956 |
| 2,769,019 | Herr | Oct. 30, 1956 |
| 2,880,204 | Fonken | Mar. 31, 1959 |

FOREIGN PATENTS

| | | |
|---|---|---|
| 737,773 | Great Britain | Sept. 28, 1955 |

OTHER REFERENCES

"Endocrinology," vol. 58 (1956), article by Block et al., pages 626–33.